US012779516B2

(12) United States Patent
Li et al.

(10) Patent No.: US 12,779,516 B2
(45) Date of Patent: Nov. 3, 2026

(54) BIOMASS POWDER IMPURITY REMOVAL, BAKING AND AUTOMATIC TREATMENT SYSTEM

(71) Applicant: Shandong University of Technology, Zibo (CN)

(72) Inventors: Yongjun Li, Zibo (CN); Shanjian Liu, Zibo (CN); Zhihe Li, Zibo (CN); Weiming Yi, Zibo (CN)

(73) Assignee: SHANDONG UNIVERSITY OF TECHNOLOGY, Zibo (CN)

(*) Notice: Subject to any disclaimer, the term of this patent is extended or adjusted under 35 U.S.C. 154(b) by 482 days.

(21) Appl. No.: 18/516,022

(22) Filed: Nov. 21, 2023

(65) Prior Publication Data

US 2024/0173756 A1 May 30, 2024

(30) Foreign Application Priority Data

Nov. 24, 2022 (CN) ........................ 202211479837.X

(51) Int. Cl.
*B09B 3/40* (2022.01)
*C10L 5/00* (2006.01)
*C10L 5/40* (2006.01)

(52) U.S. Cl.
CPC .................. *B09B 3/40* (2022.01); *C10L 5/00* (2013.01); *C10L 5/40* (2013.01)

(58) Field of Classification Search
CPC ................. B09B 3/40; C10L 5/00; C10L 5/40
See application file for complete search history.

(56) References Cited

FOREIGN PATENT DOCUMENTS

| | | | | | |
|---|---|---|---|---|---|
| CN | 102275748 | | | 12/2011 | |
| CN | 102275748 | A | * | 12/2011 | |
| CN | 104531227 | A | | 4/2015 | |
| CN | 207313550 | U | * | 5/2018 | |
| CN | 208832803 | U | * | 5/2019 | |
| CN | 109894245 | A | * | 6/2019 | |
| CN | 110469856 | A | * | 11/2019 | ................ C10L 5/48 |
| CN | 111085327 | A | * | 5/2020 | ............... B07B 1/28 |
| CN | 112999973 | A | | 6/2021 | |
| CN | 216745348 | | | 6/2022 | |

OTHER PUBLICATIONS

Cnipa, Office Action issued for CN Application No. 202211479837.X, Mar. 28, 2024.

* cited by examiner

*Primary Examiner* — Latosha Hines
(74) *Attorney, Agent, or Firm* — Hodgson Russ LLP

(57) ABSTRACT

A biomass powder impurity removal, baking and automatic treatment system includes a biomass powder lump treatment assembly, a dust removal assembly, a sealed baking treatment assembly and a cooling collection assembly. A suction port of the dust removal assembly is connected with a dust removal port of the biomass powder lump treatment assembly and a dust removal port of the sealed baking treatment assembly through pipes to collect lightweight dust. A biomass powder material containing lumps enters the sealed baking treatment assembly after being re-crushed into powder through the biomass powder lump treatment assembly, and the biomass powder material is baked into semi-coke by the sealed baking treatment assembly. The semi-coke is weighed and packed after being cooled by the cooling collection assembly.

8 Claims, 1 Drawing Sheet

BIOMASS POWDER IMPURITY REMOVAL, BAKING AND AUTOMATIC TREATMENT SYSTEM

CROSS-REFERENCE TO RELATED APPLICATION

This application claims priority to Chinese Patent Application No. 202211479837.X, filed on Nov. 24, 2022, the entire disclosure of which is incorporated herein by reference.

FIELD

Biomass powder impurity removal, baking and automatic treatment systems belong to the field of biomass pretreatment technology.

BACKGROUND

Biomass generally refers to lignocellulose such as straw, trees and the like except grain and fruits in a process of agricultural and forestry production, waste from agricultural product processing industry, agricultural and forestry waste, and livestock manure and waste and other substances in a production process of animal husbandry. Biomass resources are extremely abundant clean and renewable resources, and are highly favored by people due to their important characteristics such as renewability, sustainability, diversity, environmental friendliness and affinity for humans.

SUMMARY

A biomass powder impurity removal, baking and automatic treatment system includes a biomass powder lump treatment assembly, a dust removal assembly, a sealed baking treatment assembly and a cooling collection assembly. A suction port of the dust removal assembly is connected with a dust removal port of the biomass powder lump treatment assembly and a dust removal port of the sealed baking treatment assembly through pipes to collect lightweight dust. A biomass powder material containing lumps enters the sealed baking treatment assembly after being re-crushed into powder through the biomass powder lump treatment assembly, and the biomass powder material is baked into semi-coke by the sealed baking treatment assembly. The semi-coke is weighed and packed after being cooled by the cooling collection assembly.

DETAILED DESCRIPTION

Figure 1:
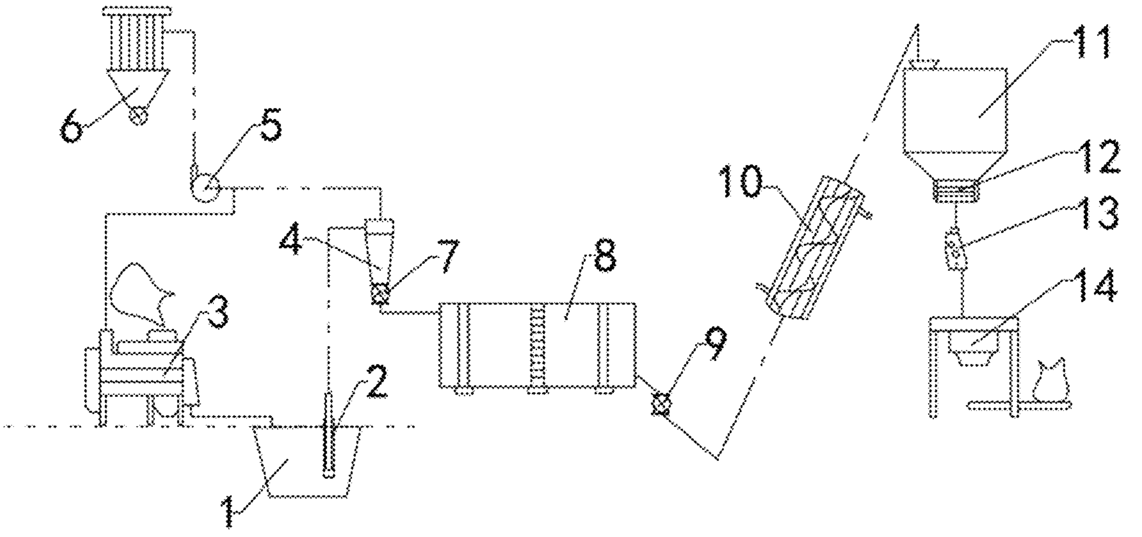
FIG. 1 is a schematic view of a biomass powder impurity removal, baking and automatic treatment system according to the present disclosure.

At present, the biomass is mostly utilized in a form of biomass powder. Biomass raw material is crushed and processed in an early stage of development and utilization, and the biomass raw material is crushed to obtain the biomass powder. The reduction of particle size may increase a specific surface area and enhance a bonding effect between particles during a compression process, improving post-processing and utilization effects. However, there is still a lack of excellent technology for further pretreatment of the biomass powder obtained from crushing.

For example, Chinese Patent CN216745348U discloses a three-dimensional drying device for biomass powder. The device includes a feeding hopper on an upper part of its device body; a drying inner chamber is defined below the feeding hopper; and a hydrothermal drum and a hot air system are horizontally distributed in the drying inner chamber in a left-right direction. An inlet cavity and an outlet cavity are arranged on a left side and a right side of the device body, respectively; the inlet cavity is provided with an inlet pipe, and the outlet cavity is provided with an outlet pipe. A right end of the hydrothermal drum is rotatably connected with the outlet cavity by a sealing bearing; and a left side of the hydrothermal drum passes through the inlet cavity and is rotatably connected with two sides of the inlet cavity by two sealing bearings. A front lower part of the drying inner chamber has a discharge port. The device can only quickly dry the biomass powder and have no subsequent treatment, that is, the utilization rate of the biomass powder is low.

The present disclosure aims to solve the technical problems in the related art and provide a biomass powder impurity removal, baking and automatic treatment system, which can effectively improve calorific value of combustion and energy density.

According to the present disclosure, a technical solution to the technical problems is a biomass powder impurity removal, baking and automatic treatment system that includes a biomass powder lump treatment assembly, a dust removal assembly, a sealed baking treatment assembly and a cooling collection assembly. A suction port of the dust removal assembly is connected with a dust removal port of the biomass powder lump treatment assembly and a dust removal port of the sealed baking treatment assembly through pipes to collect lightweight dust. A biomass powder material containing lumps enters the sealed baking treatment assembly after being re-crushed into powder through the biomass powder lump treatment assembly, and the biomass powder material is baked into semi-coke by the sealed baking treatment assembly. The semi-coke is weighed and packed after being cooled by the cooling collection assembly.

Biomass baking pretreatment refers to water removal from the biomass at high temperature and a low-temperature pyrolysis process of precipitating volatiles in the absence of oxygen or in oxygen deficiency. After the biomass is baked and pretreated, the quality of fuel can be improved, mainly in energy density and calorific value.

The biomass powder packaged in sacks has a high moisture content after absorbing moisture, and is prone to agglomerating when squeezed during storage and transportation. In the present disclosure, lumps in the raw material are crushed by the biomass powder lump treatment assembly and revert to the biomass powder. The biomass powder without lumps can enter the sealed baking treatment assembly for sealed baking by a way of negative pressure suction, and the biomass powder is baked into semi-coke. Dust generated during the crushing and material transfer process is collected by the dust removal assembly. After the lump crushing and dust removal treatment, there will be no incomplete baking due to the presence of lumps, and there will be no over-baked char due to too much dust, ensuring the quality of the semi-coke. The semi-coke can be packaged after cooling.

In some embodiments, in the biomass powder impurity removal, baking and automatic treatment system, after the lumps contained in the biomass powder material are re-crushed into powder, a particle size is 4 mm~15 mm, and a moisture content is less than 10%. Appropriate biomass power with a preferred particle size, in cooperation with the baking process, can obtain the semi-coke which is completely baked but not over-baked, ensuring the quality of the semi-coke.

In some embodiments, in the biomass powder impurity removal, baking and automatic treatment system, the dust removal assembly includes a fan and a cloth dust collector, an air inlet of the cloth dust collector is connected with an air outlet of the fan, and a suction port of the fan is connected with the dust removal port of the biomass powder lump treatment assembly and the dust removal port of the sealed baking treatment assembly through pipes. In some embodiments, the dust removal assembly can timely collect and process the dust generated during the crushing and material transfer process, achieve dust-free feeding for baking, and make the production environment more comfortable and safe.

In some embodiments, in the biomass powder impurity removal, baking and automatic treatment system, the biomass powder lump treatment assembly includes an impact crusher and a blanking pit; a dust removal port of the impact crusher is connected with a suction port of the dust removal assembly, and a suction velocity at the dust removal port of the impact crusher is 1.5 m/s 2 m/s; and the blanking pit is arranged at a discharge port of the impact crusher, and the biomass powder material containing lumps falls into the blanking pit for temporary storage after being re-crushed into powder in the impact crusher. The impact crusher destroys the lumps by impact, with high efficiency, and in cooperation with an optimal dust suction velocity, the dust in the biomass powder raw material can be completely removed.

In some embodiments, in the biomass powder impurity removal, baking and automatic treatment system, the sealed baking treatment assembly includes a negative pressure receiver, a cyclone, a first air shutter, a baking machine and a second air shutter; a feed port of the negative pressure receiver is inserted in the biomass powder material that is re-crushed into powder, and the negative pressure receiver is connected with a feed port of the cyclone in a sealing manner through a pipe; a dust removal port of the cyclone is connected to a suction port of the dust removal assembly, and a discharge port of the cyclone is connected with a feed port of the baking machine in a sealing manner through a first air shutter and a connection pipe; and the second air shutter is arranged at a discharge port of the baking machine to achieve discharge in a sealing manner.

The dust removal port of the cyclone is an air outlet of the cyclone, and the dust in the biomass powder is timely extracted in a negative pressure condition. The first air shutter and the second air shutter are arranged at inlet and outlet ends of the baking machine correspondingly, ensuring the sealing in a process that the biomass powder enters and exits the baking machine, to prevent air from entering and causing combustion. Feeding is carried out using the negative pressure receiver in conjunction with the cyclone, and feeding under negative pressure will not generate dust.

In some embodiments, in the biomass powder impurity removal, baking and automatic treatment system, a suction velocity of the negative pressure receiver is 5 m/s~8 m/s, and a wind speed at an air inlet of the cyclone is 15 m/s~18 m/s. An optimal suction velocity of the negative pressure receiver can obtain an appropriate wind conveying speed of the material. An optimal wind speed at the air inlet of the cyclone is suitable for discharge and dust removal of the cyclone, so that the dust in the material entering the baking machine is reduced as much as possible without sucking away the powder with the appropriate particle size and wasting too much material.

In some embodiments, in the biomass powder impurity removal, baking and automatic treatment system, the baking machine includes a heating shell and an spiral auger, and the heating shell is provided with a heating and heat-preservation component; the spiral auger is coaxially arranged in an inner chamber of the heating shell, two ends of the spiral auger are connected with the heating shell in a sealing manner, and an end of the spiral auger is connected with a reducer arranged outside the heating shell; the inner chamber of the heating shell has a gas exhaust port, and an exhaust pressure relief valve is arranged at the gas exhaust port; the biomass powder material entering the baking machine is heated without oxygen by the heating shell and is transformed into semi-coke; and the biomass powder material is transferred from the feed port to a discharge port of the baking machine for discharge, while the spiral auger stirs the biomass powder material.

The baking machine according to the present disclosure transfers the biomass powder from the feed port to the discharge port for discharge while stirring the biomass powder through the spiral auger, so that continuous baking with continuous feeding and continuous discharging can be realized, ensuring the continuous operation of the system and improving the production efficiency. The exhaust pressure relief valve arranged at the gas exhaust port of the baking machine is used to ensure slightly positive pressure operation inside the baking machine, and simultaneously discharge pyrolysis gas and water vapor.

The baking machine includes a baking machine outer shell, a baking machine inner shell and sealed ends. A hot flue gas chamber is between the baking machine outer shell and the baking machine inner shell, and a spiral guide plate is arranged in the hot flue gas chamber. The hot flue gas chamber has a hot flue gas inlet at its bottom and has a hot flue gas outlet at its top. The baking machine outer shell is wrapped with an insulating layer. The baking machine can efficiently heat and bake the biomass powder in a sealing manner.

In some embodiments, in the biomass powder impurity removal, baking and automatic treatment system, baking in the baking machine is performed under slightly positive pressure, with a baking pressure of 2 kPa~6 kPa, and a baking temperature of 250° C.~300° C. The preferred baking process can cooperate with the baking machine of the present disclosure, to obtain the semi-coke from the baked treated biomass powder with a fast speed and a high conversion rate.

In some embodiments, in the biomass powder impurity removal, baking and automatic treatment system, the cooling collection assembly includes a cooling screw conveyor and a weighing and packing component, a semi-coke discharge port of the sealed baking treatment assembly is connected with a feed port of the cooling screw conveyor, and a discharge port of the cooling screw conveyor is connected with the weighing and packing component. The semi-coke output from the sealed baking treatment assembly enters the cooling screw conveyor for cooling and conveying; a temperature of the semi-coke is reduced to below 30° C. through cooling and conveying; and cooled semi-coke is weighed by the weighing and packing component and is quantitatively packed. The cooling screw conveyor cools the semi-coke during the conveying process, so that the semi-coke reaches a safe temperature at which it can be packaged.

In some embodiments, in the biomass powder impurity removal, baking and automatic treatment system, the weighing and packing component includes a storage silo, a powder discharge machine, a magnetic separator and an automatic weighing and packing machine that are sequentially connected from up to down; the semi-coke is fed into the sealed storage silo; the material in the storage silo is discharged into the magnetic separator through the powder discharge machine; the magnetic separator removes ferrous impurities mixed in the material; and the material enters the automatic weighing and packing machine and is quantitatively loaded into a finished bag after being processed by the automatic weighing and packing machine.

The powder discharge machine is a biomass powder feeding machine or a low-density material discharging machine, wherein the biomass powder feeding machine is preferably a feeding machine described in Chinese Patent Application Serial No. 201110096822.0.

Compared with the related art, the biomass powder impurity removal, baking and automatic treatment system according to the present disclosure has the following beneficial effects.

The biomass powder raw material is prone to absorbing moisture and agglomerating. In the present disclosure, the biomass powder raw material packaged in sacks is poured into the impact crusher to crush the lumps; and the biomass powder with the appropriate particle size enters the baking machine to be baked into the semi-coke. There will be no incomplete baking due to the presence of the lumps, and there will be no over-baked char due to too much dust. Consequently, the quality of the semi-coke is ensured. The baking process allows the treated biomass powder to be quickly baked to obtain the semi-coke, and the semi-coke is automatically packaged after being cooled in the continuous conveying process. The system can realize automatic and continuous treatment of the biomass powder through crushing and baking.

Figure 2:
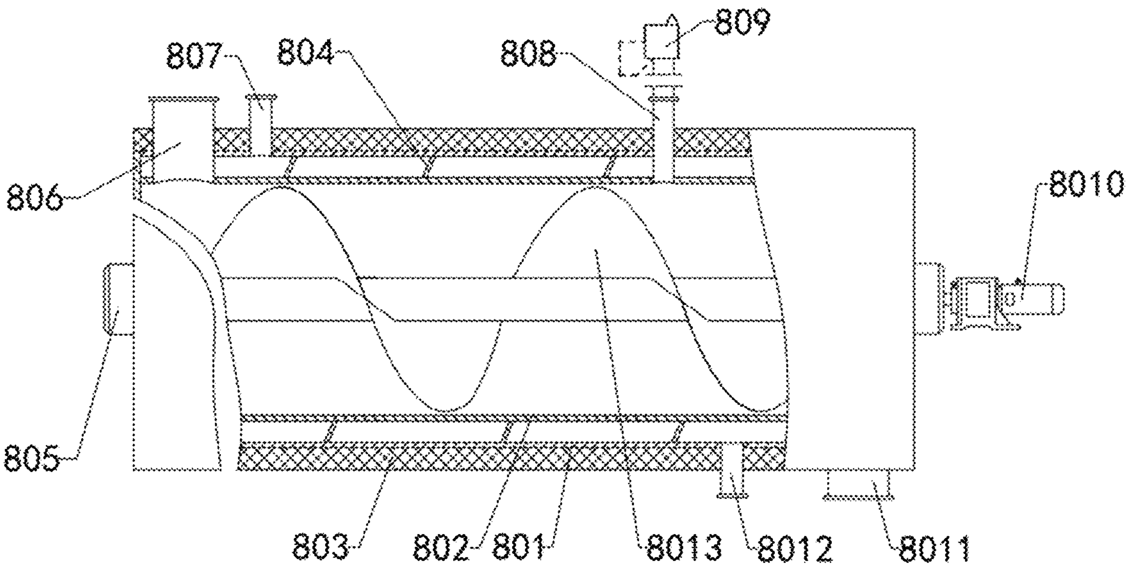
FIG. 2 is a schematic view of a baking machine of a biomass powder impurity removal, baking and automatic treatment system according to the present disclosure.

The present disclosure will be further explained with reference to FIG. 1 and FIG. 2 and specific embodiments, wherein Example 1 is an optimal example.

Example 1

After biomass powder raw material packaged in a sack enters a factory, which has a particle size of 4 mm~15 mm and a moisture content of 7.8%, the biomass powder raw material is poured into an impact crusher 3 to crush lumps, a suction velocity inside the impact crusher being 1.8 m/s. Then, the powder material is discharged into a blanking pit 1, and the powder material in the blanking pit is sucked by a negative pressure receiver 2 and enters a cyclone 4, a suction velocity of the negative pressure receiver being 6.5 m/s, and a wind speed at an air inlet of the cyclone being 16.5 m/s. Due to a centrifugal force of the cyclone 4, the powder material is discharged from a lower end of the cyclone 4 into a first air shutter 7, and the powder material is continuously discharged into a feed port 806 of a baking machine 8 through the first air shutter 7.

The baking machine 8 includes a baking machine outer shell 801, a baking machine inner shell 802, and a spiral auger 8013. A hot flue gas chamber is between the baking machine outer shell 801 and the baking machine inner shell 802, and a spiral guide plate 804 is provided in the hot flue gas chamber. The hot flue gas chamber has a hot flue gas inlet 8012 at its bottom and has a hot flue gas outlet 807 at its top. The baking machine outer shell 801 is wrapped with an insulating layer 803. The spiral auger 8013 is coaxially arranged in an inner chamber of the baking machine 8, and the spiral auger 8013 is connected with sealed ends of the baking machine 8 on two sides by a sealing bearing seat 805 to achieve sealing connection. An end of the spiral auger 8013 is also connected with a reducer 8010 arranged outside a heating shell. The inner chamber of the baking machine 8 has a gas exhaust port 808, and an exhaust pressure relief valve 809 is arranged at the gas exhaust port 808. The baking machine 8 heats without oxygen the biomass powder entering therein, so that the biomass powder is transformed into semi-coke. While the spiral auger 8013 stirs the biomass powder, the biomass powder is transferred from the feed port 806 to the discharge port 8011 for discharge.

In a process of crushing the lumps in the biomass powder raw material by the impact crusher 3, lightweight dust is sucked by a fan 5 and discharged into a cloth dust collector 6. Through filtration by the cloth dust collector, the dust is trapped in the cloth dust collector, and clean air is discharged into the atmosphere.

In a process of discharging the powder material in the cyclone 4 downwards, the lightweight dust is sucked into the cloth dust collector 6 by the fan 5. Through filtration by the cloth dust collector, the dust is trapped in the cloth dust collector, and clean air is discharged into the atmosphere.

The biomass powder material entering the baking machine 8 is baked under slightly positive pressure, with a pressure of 4 kPa. The biomass powder material is transformed into biomass semi-coke through a baking pretreatment at 280° C. The biomass semi-coke is discharged from the discharge port 8011 and enters a cooling screw conveyor 10 through a second air shutter 9. A body of the cooling screw conveyor 10 is provided with a jacket, and the jacket is connected with circulating water. The semi-coke is conveyed and cooled to 24° C. and is discharged into a storage silo 11. The storage silo is sealed to prevent moisture absorption and agglomeration of the semi-coke. The first air shutter 7 and the second air shutter 9 are arranged at inlet and outlet ends of the baking machine 8, correspondingly. The sealing during the baking process of the biomass powder material is ensured to prevent air from entering and causing combustion.

The material in the storage silo 11 is discharged into a magnetic separator 13 through a powder discharge machine, and the magnetic separator 13 removes ferrous impurities that may be mixed in the material. Then, the material enters an automatic weighing and packing machine 14, and is loaded into a finished bag after being processed by the automatic weighing and packing machine 14. Through sampling and detection, in the finished bag, the mass content of incompletely baked biomass powder in the semi-coke is 1.12% and the mass content of over-baked slag is 0.68%.

Example 2

After biomass powder raw material packaged in a sack enters a factory, which has a particle size of 4 mm-15 mm and a moisture content of less than 7.8%, the biomass powder raw material is poured into an impact crusher 3 to crush lumps, a suction velocity inside the impact crusher being 1.6 m/s. Then, the powder material is discharged into a blanking pit 1, and the powder material in the blanking pit is sucked by a negative pressure receiver 2 and enters a cyclone 4, a suction velocity of the negative pressure receiver being 6 m/s, and a wind speed at an air inlet of the cyclone being 16 m/s. Due to a centrifugal force of the cyclone 4, the powder material is discharged from a lower end of the cyclone 4 into a first air shutter 7, and the powder material is continuously discharged into a feed port 806 of a baking machine 8 through the first air shutter 7.

The baking machine 8 includes a baking machine outer shell 801, a baking machine inner shell 802, and a spiral auger 8013. A hot flue gas chamber is between the baking machine outer shell 801 and the baking machine inner shell 802, and a spiral guide plate 804 is provided in the hot flue gas chamber. The hot flue gas chamber has a hot flue gas inlet 8012 at its bottom and has a hot flue gas outlet 807 at its top. The baking machine outer shell 801 is wrapped with an insulating layer 803. The spiral auger 8013 is coaxially arranged in an inner chamber of the baking machine 8, and the spiral auger 8013 is connected with sealed ends of the baking machine 8 on two sides by a sealing bearing seat 805 to achieve sealing connection. An end of the spiral auger 8013 is also connected with a reducer 8010 arranged outside a heating shell. The inner chamber of the baking machine 8 has a gas exhaust port 808, and an exhaust pressure relief valve 809 is arranged at the gas exhaust port 808. The baking machine 8 heats without oxygen the biomass powder entering therein, so that the biomass powder is transformed into semi-coke. While the spiral auger 8013 stirs the biomass powder, the biomass powder is transferred from the feed port 806 to the discharge port 8011 for discharge.

In a process of crushing the lumps in the biomass powder raw material by the impact crusher 3, lightweight dust is sucked by a fan 5 and discharged into a cloth dust collector 6. Through filtration by the cloth dust collector, the dust is trapped in the cloth dust collector, and clean air is discharged into the atmosphere.

In a process of discharging the powder material in the cyclone 4 downwards, the lightweight dust is sucked into the cloth dust collector 6 by the fan 5. Through filtration by the cloth dust collector, the dust is trapped in the cloth dust collector, and clean air is discharged into the atmosphere.

The biomass powder material entering the baking machine 8 is baked under slightly positive pressure, with a pressure of 3 kPa. The biomass powder material is transformed into biomass semi-coke through a baking pretreatment at 290° C. The biomass semi-coke is discharged from the discharge port 8011 and enters a cooling screw conveyor 10 through a second air shutter 9. A body of the cooling screw conveyor 10 is provided with a jacket, and the jacket is connected with circulating water. The semi-coke is conveyed and cooled to 20° C. and is discharged into a storage silo 11. The storage silo is sealed to prevent moisture absorption and agglomeration of the semi-coke. The first air shutter 7 and the second air shutter 9 are arranged at inlet and outlet ends of the baking machine 8, correspondingly. The sealing during the baking process of the biomass powder material is ensured to prevent air from entering and causing combustion.

The material in the storage silo 11 is discharged into a magnetic separator 13 through a powder discharge machine, and the magnetic separator 13 removes ferrous impurities that may be mixed in the material. Then, the material enters an automatic weighing and packing machine 14, and is loaded into a finished bag after being processed by the automatic weighing and packing machine 14. Through sampling and detection, in the finished bag, the mass content of incompletely baked biomass powder in the semi-coke is 1.16% and the mass content of over-baked slag is 0.67%.

Example 3

After biomass powder raw material packaged in a sack enters a factory, which has a particle size of 4 mm~15 mm and a moisture content of less than 7.8%, the biomass powder raw material is poured into an impact crusher 3 to crush lumps, a suction velocity inside the impact crusher being 1.8 m/s. Then, the powder material is discharged into a blanking pit 1, and the powder material in the blanking pit is sucked by a negative pressure receiver 2 and enters a cyclone 4, a suction velocity of the negative pressure receiver being 7 m/s, and a wind speed at an air inlet of the cyclone being 17 m/s. Due to a centrifugal force of the cyclone 4, the powder material is discharged from a lower end of the cyclone 4 into a first air shutter 7, and the powder material is continuously discharged into a feed port 806 of a baking machine 8 through the first air shutter 7.

The baking machine 8 includes a baking machine outer shell 801, a baking machine inner shell 802, and a spiral auger 8013. A hot flue gas chamber is between the baking machine outer shell 801 and the baking machine inner shell 802, and a spiral guide plate 804 is provided in the hot flue gas chamber. The hot flue gas chamber has a hot flue gas inlet 8012 at its bottom and has a hot flue gas outlet 807 at its top. The baking machine outer shell 801 is wrapped with an insulating layer 803. The spiral auger 8013 is coaxially arranged in an inner chamber of the baking machine 8, and the spiral auger 8013 is connected with sealed ends of the baking machine 8 on two sides by a sealing bearing seat 805 to achieve sealing connection. An end of the spiral auger 8013 is also connected with a reducer 8010 arranged outside a heating shell. The inner chamber of the baking machine 8 has a gas exhaust port 808, and an exhaust pressure relief valve 809 is arranged at the gas exhaust port 808. The baking machine 8 heats without oxygen the biomass powder entering therein, so that the biomass powder is transformed into semi-coke. While the spiral auger 8013 stirs the biomass powder, the biomass powder is transferred from the feed port 806 to the discharge port 8011 for discharge.

In a process of crushing the lumps in the biomass powder raw material by the impact crusher 3, lightweight dust is sucked by a fan 5 and discharged into a cloth dust collector 6. Through filtration by the cloth dust collector, the dust is trapped in the cloth dust collector, and clean air is discharged into the atmosphere.

In a process of discharging the powder material in the cyclone 4 downwards, the lightweight dust is sucked into the cloth dust collector 6 by the fan 5. Through filtration by the cloth dust collector, the dust is trapped in the cloth dust collector, and clean air is discharged into the atmosphere.

The biomass powder material entering the baking machine 8 is baked under slightly positive pressure, with a pressure of 5 kPa. The biomass powder material is transformed into biomass semi-coke through a baking pretreatment at 260° C. The biomass semi-coke is discharged from the discharge port 8011 and enters a cooling screw conveyor 10 through a second air shutter 9. A body of the cooling screw conveyor 10 is provided with a jacket, and the jacket is connected with circulating water. The semi-coke is conveyed and cooled to 26° C. and is discharged into a storage silo 11. The storage silo is sealed to prevent moisture absorption and agglomeration of the semi-coke. The first air shutter 7 and the second air shutter 9 are arranged at inlet and outlet ends of the baking machine 8, correspondingly. The sealing during the baking process of the biomass powder material is ensured to prevent air from entering and causing combustion.

The material in the storage silo 11 is discharged into a magnetic separator 13 through a powder discharge machine, and the magnetic separator 13 removes ferrous impurities that may be mixed in the material. Then, the material enters an automatic weighing and packing machine 14, and is loaded into a finished bag after being processed by the automatic weighing and packing machine 14. Through sampling and detection, in the finished bag, the mass content of incompletely baked biomass powder in the semi-coke is 1.07% and the mass content of over-baked slag is 1.16%.

Example 4

After biomass powder raw material packaged in a sack enters a factory, which has a particle size of 4 mm~15 mm and a moisture content of less than 7.8%, the biomass powder raw material is poured into an impact crusher 3 to crush lumps, a suction velocity inside the impact crusher being 1.5 m/s. Then, the powder material is discharged into a blanking pit 1, and the powder material in the blanking pit is sucked by a negative pressure receiver 2 and enters a cyclone 4, a suction velocity of the negative pressure receiver being 5 m/s, and a wind speed at an air inlet of the cyclone being 15 m/s. Due to a centrifugal force of the cyclone 4, the powder material is discharged from a lower end of the cyclone 4 into a first air shutter 7, and the powder material is continuously discharged into a feed port 806 of a baking machine 8 through the first air shutter 7.

The baking machine 8 includes a baking machine outer shell 801, a baking machine inner shell 802, and a spiral auger 8013. A hot flue gas chamber is between the baking machine outer shell 801 and the baking machine inner shell 802, and a spiral guide plate 804 is provided in the hot flue gas chamber. The hot flue gas chamber has a hot flue gas inlet 8012 at its bottom and has a hot flue gas outlet 807 at its top. The baking machine outer shell 801 is wrapped with an insulating layer 803. The spiral auger 8013 is coaxially arranged in an inner chamber of the baking machine 8, and the spiral auger 8013 is connected with sealed ends of the baking machine 8 on two sides by a sealing bearing seat 805 to achieve sealing connection. An end of the spiral auger 8013 is also connected with a reducer 8010 arranged outside a heating shell. The inner chamber of the baking machine 8 has a gas exhaust port 808, and an exhaust pressure relief valve 809 is arranged at the gas exhaust port 808. The baking machine 8 heats without oxygen the biomass powder entering therein, so that the biomass powder is transformed into semi-coke. While the spiral auger 8013 stirs the biomass powder, the biomass powder is transferred from the feed port 806 to the discharge port 8011 for discharge.

In a process of crushing the lumps in the biomass powder raw material by the impact crusher 3, lightweight dust is sucked by a fan 5 and discharged into a cloth dust collector 6. Through filtration by the cloth dust collector, the dust is trapped in the cloth dust collector, and clean air is discharged into the atmosphere.

In a process of discharging the powder material in the cyclone 4 downwards, the lightweight dust is sucked into the cloth dust collector 6 by the fan 5. Through filtration by the cloth dust collector, the dust is trapped in the cloth dust collector, and clean air is discharged into the atmosphere.

The biomass powder material entering the baking machine 8 is baked under slightly positive pressure, with a pressure of 2 kPa. The biomass powder material is transformed into biomass semi-coke through a baking pretreatment at 250° C. The biomass semi-coke is discharged from the discharge port 8011 and enters a cooling screw conveyor 10 through a second air shutter 9. A body of the cooling screw conveyor 10 is provided with a jacket, and the jacket is connected with circulating water. The semi-coke is conveyed and cooled to 25° C. and is discharged into a storage silo 11. The storage silo is sealed to prevent moisture absorption and agglomeration of the semi-coke. The first air shutter 7 and the second air shutter 9 are arranged at inlet and outlet ends of the baking machine 8, correspondingly. The sealing during the baking process of the biomass powder material is ensured to prevent air from entering and causing combustion.

The material in the storage silo 11 is discharged into a magnetic separator 13 through a powder discharge machine, and the magnetic separator 13 removes ferrous impurities that may be mixed in the material. Then, the material enters an automatic weighing and packing machine 14, and is loaded into a finished bag after being processed by the automatic weighing and packing machine 14. Through sampling and detection, in the finished bag, the mass content of incompletely baked biomass powder in the semi-coke is 2.32% and the mass content of over-baked slag is 0.53%.

Example 5

After biomass powder raw material packaged in a sack enters a factory, which has a particle size of 4 mm~15 mm and a moisture content of less than 7.8%, the biomass powder raw material is poured into an impact crusher 3 to crush lumps, a suction velocity inside the impact crusher being 2 m/s. Then, the powder material is discharged into a blanking pit 1, and the powder material in the blanking pit is sucked by a negative pressure receiver 2 and enters a cyclone 4, a suction velocity of the negative pressure receiver being 8 m/s, and a wind speed at an air inlet of the cyclone being 18 m/s. Due to a centrifugal force of the cyclone 4, the powder material is discharged from a lower end of the cyclone 4 into a first air shutter 7, and the powder material is continuously discharged into a feed port 806 of a baking machine 8 through the first air shutter 7.

The baking machine 8 includes a baking machine outer shell 801, a baking machine inner shell 802, and a spiral auger 8013. A hot flue gas chamber is between the baking machine outer shell 801 and the baking machine inner shell 802, and a spiral guide plate 804 is provided in the hot flue gas chamber. The hot flue gas chamber has a hot flue gas inlet 8012 at its bottom and has a hot flue gas outlet 807 at its top. The baking machine outer shell 801 is wrapped with an insulating layer 803. The spiral auger 8013 is coaxially arranged in an inner chamber of the baking machine 8, and the spiral auger 8013 is connected with sealed ends of the baking machine 8 on two sides by a sealing bearing seat 805 to achieve sealing connection. An end of the spiral auger 8013 is also connected with a reducer 8010 arranged outside a heating shell. The inner chamber of the baking machine 8 has a gas exhaust port 808, and an exhaust pressure relief valve 809 is arranged at the gas exhaust port 808. The baking machine 8 heats without oxygen the biomass powder entering therein, so that the biomass powder is transformed into semi-coke. While the spiral auger 8013 stirs the biomass powder, the biomass powder is transferred from the feed port 806 to the discharge port 8011 for discharge.

In a process of crushing the lumps in the biomass powder raw material by the impact crusher 3, lightweight dust is sucked by a fan 5 and discharged into a cloth dust collector 6. Through filtration by the cloth dust collector, the dust is trapped in the cloth dust collector, and clean air is discharged into the atmosphere.

In a process of discharging the powder material in the cyclone 4 downwards, the lightweight dust is sucked into the cloth dust collector 6 by the fan 5. Through filtration by the cloth dust collector, the dust is trapped in the cloth dust collector, and clean air is discharged into the atmosphere.

The biomass powder material entering the baking machine 8 is baked under slightly positive pressure, with a pressure of 6 kPa. The biomass powder material is transformed into biomass semi-coke through a baking pretreatment at 300° C. The biomass semi-coke is discharged from the discharge port 8011 and enters a cooling screw conveyor 10 through a second air shutter 9. A body of the cooling screw conveyor 10 is provided with a jacket, and the jacket is connected with circulating water. The semi-coke is conveyed and cooled to 28° C. and is discharged into a storage silo 11. The storage silo is sealed to prevent moisture absorption and agglomeration of the semi-coke. The first air shutter 7 and the second air shutter 9 are arranged at inlet and outlet ends of the baking machine 8, correspondingly. The sealing during the baking process of the biomass powder material is ensured to prevent air from entering and causing combustion.

The material in the storage silo 11 is discharged into a magnetic separator 13 through a powder discharge machine, and the magnetic separator 13 removes ferrous impurities that may be mixed in the material. Then, the material enters an automatic weighing and packing machine 14, and is loaded into a finished bag after being processed by the automatic weighing and packing machine 14. Through sampling and detection, in the finished bag, the mass content of incompletely baked biomass powder in the semi-coke is 0.96% and the mass content of over-baked slag is 1.68%.

Comparative Example 1

After biomass powder raw material packaged in a sack enters a factory, which has a particle size of 4 mm~15 mm and a moisture content of 7.8%, the biomass powder is directly fed into a baking machine 8.

The biomass powder material entering the baking machine 8 is baked under slightly positive pressure, with a pressure of 4 kPa. The biomass powder material is transformed into biomass semi-coke through a baking pretreatment at 280° C. The biomass semi-coke is discharged from the discharge port 8011 and enters a cooling screw conveyor 10 through a second air shutter 9. A body of the cooling screw conveyor 10 is provided with a jacket, and the jacket is connected with circulating water. The semi-coke is conveyed and cooled to 24° C. and is discharged into a storage silo 11. The storage silo is sealed to prevent moisture absorption of the semi-coke. The first air shutter 7 and the second air shutter 9 are arranged at inlet and outlet ends of the baking machine 8, correspondingly. The sealing during the baking process of the biomass powder material is ensured to prevent air from entering and causing combustion.

The material in the storage silo 11 is discharged into a magnetic separator 13 through a powder discharge machine, and the magnetic separator 13 removes ferrous impurities that may be mixed in the material. Then, the material enters an automatic weighing and packing machine 14, and is loaded into a finished bag after being processed by the automatic weighing and packing machine 14. Through sampling and detection, in the finished bag, the mass content of incompletely baked biomass powder in the semi-coke is 17.62% and the mass content of over-baked slag is 12.78%.

Comparative Example 2

After biomass powder raw material packaged in a sack enters a factory, which has a particle size of 4 mm~15 mm and a moisture content of 7.8%, the biomass powder raw material is poured into an impact crusher 3 to crush lumps, a suction velocity inside the impact crusher being 1.8 m/s. Then, the powder material is directly fed into a baking machine 8.

The biomass powder material entering the baking machine 8 is baked under slightly positive pressure, with a pressure of 4 kPa. The biomass powder material is transformed into biomass semi-coke through a baking pretreatment at 280° C. The biomass semi-coke is discharged from the discharge port 8011 and enters a cooling screw conveyor 10 through a second air shutter 9. A body of the cooling screw conveyor 10 is provided with a jacket, and the jacket is connected with circulating water. The semi-coke is conveyed and cooled to 24° C. and is discharged into a storage silo 11, which is sealed. The first air shutter 7 and the second air shutter 9 are arranged at inlet and outlet ends of the baking machine 8, correspondingly. The sealing during the baking process of the biomass powder material is ensured to prevent air from entering and causing combustion.

The material in the storage silo 11 is discharged into a magnetic separator 13 through a powder discharge machine, and the magnetic separator 13 removes ferrous impurities that may be mixed in the material. Then, the material enters an automatic weighing and packing machine 14, and is loaded into a finished bag after being processed by the automatic weighing and packing machine 14. Through sampling and detection, in the finished bag, the mass content of incompletely baked biomass powder in the semi-coke is 3.22% and the mass content of over-baked slag is 9.13%.

The above merely describes some embodiments of the present disclosure and is not intended to limit the present disclosure in any form. Those skilled in the art may achieve equivalent embodiments through changes or modifications based on the above description. Any simple modifications, equivalent changes, and variations of the above embodiments, which do not deviate from the technical solutions of the present disclosure, still fall within the protection scope of the present disclosure.

What is claimed:

1. A biomass powder impurity removal, baking and automatic treatment system, comprising a biomass powder lump treatment assembly, a dust removal assembly, a sealed baking treatment assembly and a cooling collection assembly, wherein:

a suction port of the dust removal assembly is connected with a dust removal port of the biomass powder lump treatment assembly and a dust removal port of the sealed baking treatment assembly through pipes to collect lightweight dust;

a biomass powder material containing lumps enters the sealed baking treatment assembly after being re-crushed into powder through the biomass powder lump treatment assembly, and the biomass powder material is baked into semi-coke by the sealed baking treatment assembly;

the semi-coke is weighed and packed after being cooled by the cooling collection assembly;

the dust removal assembly comprises a fan and a cloth dust collector, an air inlet of the cloth dust collector is connected with an air outlet of the fan, and a suction port of the fan is connected with the dust removal port of the biomass powder lump treatment assembly and the dust removal port of the sealed baking treatment assembly through pipes;

the biomass powder lump treatment assembly comprises an impact crusher and a blanking pit, a dust removal port of the impact crusher is connected with the suction port of the dust removal assembly, the blanking pit is arranged at a discharge port of the impact crusher, and the biomass powder material containing lumps falls into the blanking pit for temporary storage after being re-crushed into the powder in the impact crusher;

the sealed baking treatment assembly comprises a negative pressure receiver, a cyclone, a first air shutter, a baking machine and a second air shutter; a feed port of the negative pressure receiver is inserted in the biomass powder material that is re-crushed into the powder, and the negative pressure receiver is connected with a feed port of the cyclone in a sealing manner through a pipe; a dust removal port of the cyclone is connected to the suction port of the dust removal assembly, and a discharge port of the cyclone is connected with a feed port of the baking machine in a sealing manner through the first air shutter and a connection pipe; and the second air shutter is arranged at a discharge port of the baking machine to achieve discharge in a sealing manner; and the cooling collection assembly comprises a cooling screw conveyor and a weighing and packing component, a semi-coke discharge port of the sealed baking treatment assembly is connected with a feed port of the cooling screw conveyor, and a discharge port of the cooling screw conveyor is connected with the weighing and packing component.

2. The biomass powder impurity removal, baking and automatic treatment system according to claim 1, wherein after the lumps contained in the biomass powder material are re-crushed into the powder, a particle size is 4 mm~15 mm, and a moisture content is less than 10%.

3. The biomass powder impurity removal, baking and automatic treatment system according to claim 1, wherein:

a suction velocity at the dust removal port of the impact crusher is 1.5 m/s~2 m/s.

4. The biomass powder impurity removal, baking and automatic treatment system according to claim 1, wherein a suction velocity of the negative pressure receiver is 5 m/s~8 m/s, and a wind speed at an air inlet of the cyclone is 15 m/s~18 m/s.

5. The biomass powder impurity removal, baking and automatic treatment system according to claim 1, wherein:

the baking machine comprises a heating shell and an spiral auger, and the heating shell is provided with a heating and heat-preservation component;

the spiral auger is coaxially arranged in an inner chamber of the heating shell, two ends of the spiral auger are connected with the heating shell in a sealing manner, and an end of the spiral auger is connected with a reducer arranged outside the heating shell;

the inner chamber of the heating shell has a gas exhaust port, and an exhaust pressure relief valve is arranged at the gas exhaust port;

the biomass powder material entering the baking machine is heated without oxygen by the heating shell and is transformed into semi-coke; and the biomass powder material is transferred from the feed port to the discharge port of the baking machine for discharge, while the spiral auger stirs the biomass powder material.

6. The biomass powder impurity removal, baking and automatic treatment system according to claim 1, wherein baking in the baking machine is performed under slightly positive pressure, with a baking pressure of 2 kPa~6 kPa, and a baking temperature of 250° C.~300° C.

7. The biomass powder impurity removal, baking and automatic treatment system according to claim 1, wherein:

the semi-coke output from the sealed baking treatment assembly enters the cooling screw conveyor for cooling and conveying, a temperature of the semi-coke is reduced to below 30° C. through cooling and conveying, and cooled semi-coke is weighed by the weighing and packing component and is quantitatively packed.

8. The biomass powder impurity removal, baking and automatic treatment system according to claim 7, wherein:

the weighing and packing component comprises a storage silo, a powder discharge machine, a magnetic separator and an automatic weighing and packing machine that are sequentially connected from up to down;

the semi-coke is fed into the sealed storage silo;

material in the storage silo is discharged into the magnetic separator through the powder discharge machine;

the magnetic separator removes ferrous impurities mixed in the material; and the material enters the automatic weighing and packing machine and is quantitatively loaded into a finished bag after being processed by the automatic weighing and packing machine.

* * * * *